United States Patent
Stirbu et al.

(10) Patent No.: US 8,451,848 B2
(45) Date of Patent: May 28, 2013

(54) METHOD AND SYSTEM FOR OPTIMIZATION OF DATA TRANSFER BETWEEN NETWORKED DEVICES

(75) Inventors: Vlad Stirbu, Tampere (FI); Mika Saaranen, Tampere (FI)

(73) Assignee: Nokia Corporation, Espoo (FI)

( * ) Notice: Subject to any disclaimer, the term of this patent is extended or adjusted under 35 U.S.C. 154(b) by 526 days.

(21) Appl. No.: 10/587,979

(22) PCT Filed: Feb. 4, 2005

(86) PCT No.: PCT/FI2005/000077
§ 371 (c)(1),
(2), (4) Date: Oct. 10, 2006

(87) PCT Pub. No.: WO2005/076567
PCT Pub. Date: Aug. 18, 2005

(65) Prior Publication Data
US 2007/0127394 A1    Jun. 7, 2007

(30) Foreign Application Priority Data
Feb. 6, 2004  (FI) ..................... 20040179

(51) Int. Cl.
*H04L 12/56* (2006.01)
*H04L 12/28* (2006.01)
(52) U.S. Cl.
USPC .................... 370/401; 370/254; 370/389
(58) Field of Classification Search
None
See application file for complete search history.

(56) References Cited

U.S. PATENT DOCUMENTS

| | | | |
|---|---|---|---|
| 5,742,905 A | 4/1998 | Pepe et al. | |
| 5,999,530 A | 12/1999 | LeMaire et al. | |
| 6,288,739 B1 | 9/2001 | Hales et al. | |
| 7,339,903 B2 * | 3/2008 | O'Neill | 370/313 |
| 2003/0061333 A1 | 3/2003 | Dean et al. | |
| 2003/0084191 A1 * | 5/2003 | Yamamoto | 709/249 |
| 2004/0133689 A1 * | 7/2004 | Vasisht | 709/228 |
| 2004/0167988 A1 * | 8/2004 | Rune et al. | 709/238 |
| 2005/0036489 A1 * | 2/2005 | Jou et al. | 370/392 |
| 2006/0136562 A1 * | 6/2006 | Tung | 709/208 |

FOREIGN PATENT DOCUMENTS

| | | |
|---|---|---|
| JP | 2000-324120 A | 11/2000 |
| JP | 2003-204355 | 7/2003 |

OTHER PUBLICATIONS

Shun Namai, et al., "Trade Catalog Purchasable Now!, [Must-Have! Internet-ready Digital Home Electronics]", INTERNET magazine, No. 91, pp. 94-129, Impress Co., Aug. 1, 2002.
"UPnP™ Device Architecture 1.0" UPnP™ Forum, Version 1.0.1, May 6, 2003, 82 pgs.

* cited by examiner

*Primary Examiner* — Ayaz Sheikh
*Assistant Examiner* — Sori Aga
(74) *Attorney, Agent, or Firm* — Harrington & Smith

(57) ABSTRACT

The invention relates to a method of arranging communication in a local area networking system comprising a first device, a second device and an intermediate node for arranging data transmission between the first device and the second device. The second device is arranged to multicast and/or broadcast messages to devices in the system. The transmission of multicast and/or broadcast messages to the first device is prevented by the interworking means.

18 Claims, 2 Drawing Sheets

METHOD AND SYSTEM FOR OPTIMIZATION OF DATA TRANSFER BETWEEN NETWORKED DEVICES

FIELD OF THE INVENTION

The present invention relates to optimization of data transfer between networked devices.

BACKGROUND OF THE INVENTION

Available wireless local area networking technologies such as the Bluetooth technology are widely included in various mobile devices. The devices are typically allocated an IP (Internet Protocol) address and they may communicate with other devices using the IP protocol stack. Besides desktop/laptop computers and mobile terminals, networking technologies are also incorporated to various domestic appliances, such as TV sets, set-top boxes, stereo systems, personal music players, cameras, home management systems and fridges. It is expected that various domestic appliances will be capable of interacting with other devices and sharing information by using especially wireless local area networking technologies and IP-based technologies.

UPnP™ (Universal Plug and Play) technology by UPnP Forum defines an architecture for peer-to-peer network connectivity of intelligent appliances, wireless devices, and personal computers of all form factors. It is designed to bring easy-to-use, flexible, standard-based connectivity to ad-hoc or unmanaged networks whether in the home, in a small business, public spaces, or attached to the Internet. UPnP technology provides a distributed, open networking architecture that leverages TCP/IP (Transport Control Protocol/Internet Protocol) and the Web technologies to enable seamless proximity networking in addition to control and data transfer among networked devices from a wide range of vendors. According to the UPnP Device Architecture (UDA) a device can dynamically join a network, obtain an IP address, convey its capabilities to other devices, and learn about the presence and capabilities of other devices.

The DHWG (Digital Home Working Group) HNv1 (Home Network version 1) specification describes an environment formed by devices like PCs, TV sets, set-top boxes, stereo systems, etc. that are connected to the network via an IEEE 802.x interface including the Ethernet and the wireless local area network WLAN. The devices forming the HNv1 environment are by their nature static or with very limited mobility, allowing them to be always connected to an AC (Alternating Current) power supply. At the same time the connectivity technology they use allows high data rates and low latency.

Constrained devices like mobile phones, PDAs (Personal Digital Assistant), portable music players or cameras are typically not able to support 802.x communication technology, but they often deploy energy saving short-range communication media, such as Bluetooth. Short-range communication media typically exhibits more limited bandwidth and longer delays than an IEEE802.x media. Since these constrained devices or in DHWG terminology mobile handheld devices use different communication media than HNv1 devices, an interworking unit is required. Connecting different networks together as such is commonly used technology, but the architecture of HNv1 exhibits communication environment which is problematic for mobile handheld devices that have limited energy resources and/or slow communication link. HNv1 specifies that the UPnP is used as service discovery and controlling protocol suite, which potentially and in certain conditions may result in a considerable amount of communication for which the device needs to response. More particularly, according to the UPnP discovery protocol the UPnP devices advertise their services to other devices in the system by sending multicast messages. Further, also services and/or interested devices may be searched by multicast requests. The UPnP specification specifies that a UPnP devices should send each advertisement message more than once due to the usage of unreliable UDP (User Datagram Protocol). The result is that the numerous multicast messages will consume the battery of the receiving device within a much shorter time, causing unsatisfactory user experience. Also, in some conditions a considerable amount of the capacity of the connecting link is used for control communication, which prevents the use of the services available.

BRIEF DESCRIPTION OF THE INVENTION

There is a need to alleviate the above disadvantages. The needs are fulfilled by a method, a system, a device, a chip, and a computer program product which are characterized by what is stated in the independent claims. Some embodiments of the invention are disclosed in the dependent claims.

The invention is based on the idea of preventing the transmission of at least some multicast and/or broadcast messages from a second device to a first device by an intermediate node arranging data transmission between the first device and the second device. The local area networking system may be any local network configuration. For instance, it may comprise a Bluetooth network and/or an IEEE 802.11 WLAN network.

An advantage of the method and arrangement of the invention is that less processing is required in the first device, because fewer messages are received. Thereby the power consumption of the constrained devices such as handheld PDAs, mobile stations, or music players can be reduced. For bandwidth limited links the reduced bandwidth usage is naturally also an advantage, and thus a faster link is available for other data transmission. As the transfer of multicast and/or broadcast messages is reduced, the response time of the system and the average propagation time are shorter. Further, the (first) devices not receiving multicast messages can still support all functions of the system, e.g. full UPnP stack, to be available in case they are connected to the system such that multicast messages can be received. This makes it easier to reach full compatibility with the second device for example for enabling connectivity in configurations where there is direct connection between the first and the second device. One further advantage of the invention is that it is easy to implement for various technologies, thereby enabling a reduction in the costs of the end product.

BRIEF DESCRIPTION OF THE DRAWINGS

In the following the invention will be described in greater detail by means of some embodiments with reference to the accompanying drawings, in which.

DETAILED DESCRIPTION OF THE INVENTION

An embodiment of the invention will be illustrated in the following in a UPnP system, but the invention can also be applied to other networking systems in which communication is arranged between handheld like constrained devices and devices without such constraints.

Figure 1:
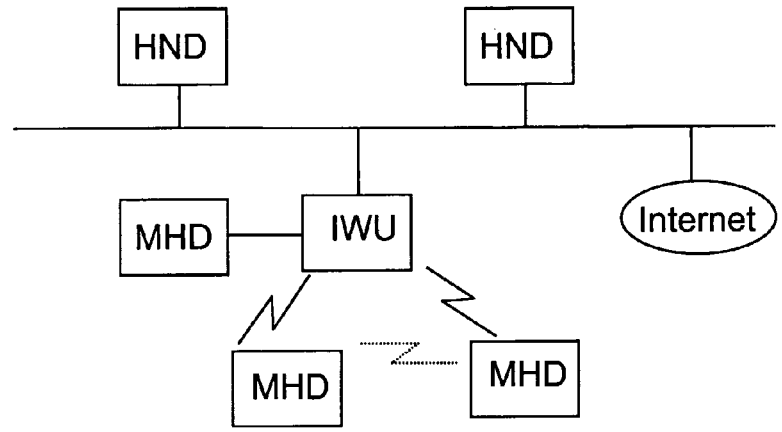
FIG. 1 illustrates a local area networking system.

Referring to FIG. 1, the system comprises mobile handheld devices MHD, an intermediate node, in the embodiment of FIG. 1 an interworking unit IWU, and home network devices HND supporting the UPnP home network version 1 (HNv1) specification. The devices HND form the HNv1 domain and the devices MHD form the MHS (Mobile Handheld Subcommittee) domain. The interworking unit IWU is at the edge of these domains and it provides adaptation of the data transmission between these domains. It is to be noted that there may also be other devices between the IWU and the MHD and/or between the IWU and the HND. The IWU may be a specific device or implemented as a part of another device, such as a router, an extended bridge or a multimedia set top box. In the example of FIG. 1, the HNv1 domain uses a wired network, e.g. Ethernet, and the MHS domain utilizes wireless networking technology, e.g. Bluetooth. As further shown in FIG. 1, it is feasible that a MHD may connect with the IWU using a wired link, such as USB (Universal Serial Bus), and the handheld devices MHD may also communicate between themselves and thus form a Bluetooth piconet, for instance. Further, the HNv1 domain may be connected to other networks, such as the Internet. It is to be noted that the handheld devices MHD or the HNv1 devices HND may also comprise other communication means. For instance, a mobile handheld device MHD may comprise a transceiver for communicating with the PLMN (Public Land Mobile Network). Some examples of devices MHD are PDAs, laptop computers, personal music players, headsets, mobile phones and cameras. HNv1 devices HND are typically always connected to an AC power supply, and these devices include TV sets, stereo devices and home management devices.

Figure 2A:
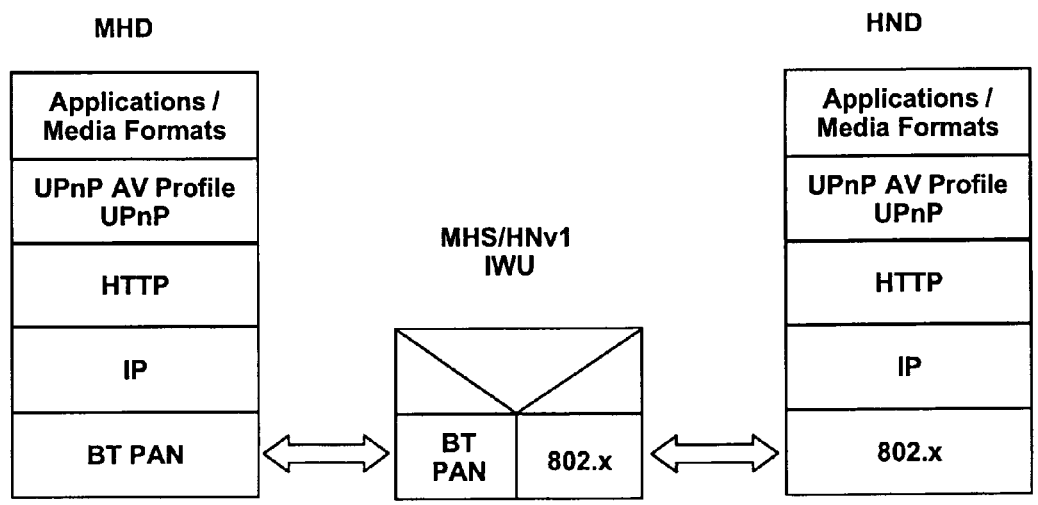
FIG. 2a describes the protocol stack architecture according to an embodiment of the invention.

FIG. 2a describes one feasible protocol stack architecture for a UPnP system. The data transmission link between MHD and IWU (and in one embodiment between MHDs) may be provided by the well-known Bluetooth PAN (Personal Area Network). Information on Bluetooth technology can be found from http://www.bluetooth.com/. The data transmission between the IWU and the HND may be provided by any IEEE 802-based data transmission technology providing a uniform upper API (Application Programming Interface) and LLC (Logical Link Control) layer for a number of different MAC (Medium Access Control) and L1 solutions, including the wired Ethernet or 802.11-based WLAN technologies. The IWU is in one embodiment arranged to remove the IEEE 802.x headers from HND-originated packets and to add necessary Bluetooth headers. Reverse actions are done for packets originating from the MHD. It is to be noted that the invention may also be implemented by other local area networking technologies, some examples of which are BRAN (Broadband Radio Access Networks) specifications (HIPERLAN1, HIPERLAN2, HIPERACCESS). A UPnP device MHD, HND supports IP version 4, IP version 6, or both. The link between the MHD and the IWU is according to another embodiment wired and implemented by USB.

HTTP protocol is used between the MHD and HND above a TCP layer (not shown in FIG. 2a) to transfer the UPnP layer messages. For sending and receiving advertisements and search requests according to the UPnP discovery protocol, the devices MHD and HND use multicast variant of HTTP, and for responses a unicast variant of HTTP is used. Both of these HTTP variants use UDP instead of the TCP. UPnP specific functions are implemented in the MHD and HND by UPnP and UPnP AV (Audio Visual) Profile functions. Applications and various media formats may then utilize the UPnP functions.

Figure 2B:
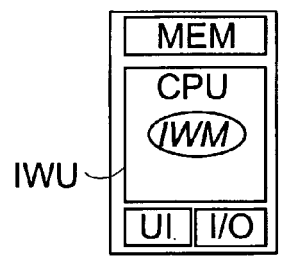
FIG. 2b illustrates a device comprising the interworking unit.

As illustrated in FIG. 2b, the device functioning as the IWU comprises memory MEM, a user interface UI, I/O-means I/O for arranging communication, and a central processing unit CPU comprising one or more processors. Computer program codes executed in the central processing unit CPU may be used for causing the device IWU to implement the interworking means IWM for arranging transfer of data between the MHD and the HND. Further, computer program codes executed in the central processing unit CPU may be used for causing the device IWU to implement the inventive functions relating to the forwarding of messages to the MHD, some embodiments of which are illustrated later in association with FIG. 3. As one example, the inventive functions may be provided as an extension to the application implementing the interworking means IWM. A chip unit or some other kind of module for controlling a data processing device (IWU) for a local area networking system may in one embodiment cause the device to perform the inventive functions. The module may form part of the device IWU and could be removable, i.e. it can be inserted into another unit or device. Computer program codes can be received via a network and/or be stored in memory means, for instance on a disk, a CD-ROM disk or other external memory means, from where they can be loaded into the memory MEM of the processing device. Hardware solutions or a combination of hardware and software solutions may also be used to implement the inventive functions.

Figure 3:
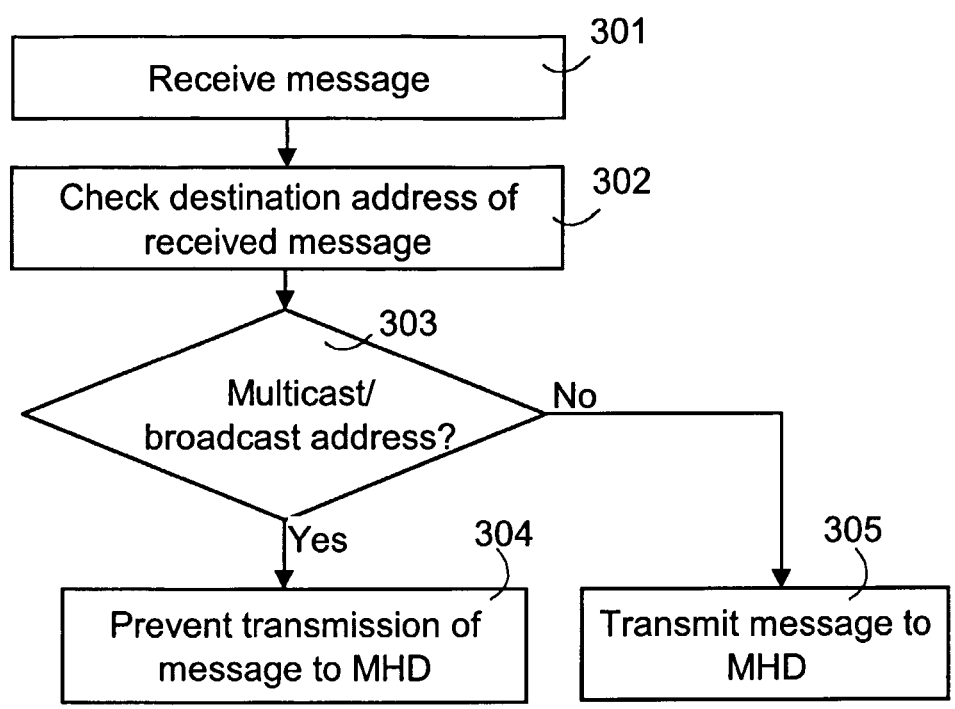
FIG. 3 is a flow diagram illustrating a method according to an embodiment of the invention.

FIG. 3 illustrates a method according to an embodiment of the invention. The method may be implemented in the interworking unit IWU. In step 301 a message is received. The destination address of the received message is checked 302. According to an embodiment, the IWU compares one or more properties of the message to the properties determined in predetermined message transmission conditions (may be stored in memory MEM), and if they match, the message is, depending on the implementation, either forwarded or prevented from being transmitted to the MHD. The IWU may store one or more addresses which are pre-determined in the system as being broadcast or multicast addresses. For instance, the IWU may be pre-configured with a list of multicast addresses. If the destination address of the received packet matches with an entry in this list, the packet is not transmitted to the constrained device. In UPnP the multicast address is already specified as being 239.255.255.250 for all UPnP systems. If, on the basis of the check 302, 303, the destination address is a multicast or broadcast address, the transmission of the message to the constrained device, in the example of FIGS. 1 and 2a to the MHD, is prevented 304. Otherwise the message is transmitted 305 to the MHD. Thanks to the embodiment to which the method is applied in the IWU, no changes are necessary to the MHD or the HND.

Instead of the above-illustrated method, the data transmission between the constrained device (MHD) and the non-constrained device (HND) may also be arranged by other means. For instance, after step 301 there could be an additional checking step in UPnP system on whether the message was received on an HNv1 interface. If, in such a case, the message is received on HNv1 interface, the method will proceed to current step 302, otherwise the method will not proceed. Thus only HNv1 interface packets need to be analysed.

According to still another embodiment, there can be one or more other additional checking steps relating to the receiving device (MHD) before entering the step 305. The IWU may check whether the link is available to the MHD. For instance, in the case of Bluetooth, the system checks if the BT is in the "sleep" mode. If it is in the sleep mode, the IWU will wake up the BT before entering step 305. If BT is active, step 305 can be entered directly.

According to an embodiment, not all multicast and/or broadcast messages are prevented from being transmitted to the MHD. The IWU may be provided with message transmission conditions, including information on message types, and/or with other message details, and the IWU may be arranged to check (in step 302/303 or in an additional step preferably before step 302) whether the received message complies with the predetermined conditions. This embodiment provides the advantage that even very detailed conditions on transferred or blocked messages can be determined, thereby still enabling critical messages to be forwarded but preventing the transmission of less important messages. This further optimizes the usage of transmission capabilities in the system. Depending on the desired implementation, the message complying with the conditions may be forwarded to the MHD or prevented from being forwarded to the MHD in a case where the conditions determine the blocked or filtered messages. For instance, certain types of messages or multicast and/or broadcast messages using a particular number are forwarded to the MHD but other multicast and/or broadcast messages are not. In the UPnP system the following embodiment becomes important: The IWU is arranged only to prevent the transmission of multicast messages and it will forward at least part of or all broadcast messages to the MHD.

Two general classifications of devices are defined by the UPnP architecture: controlled devices and control points. A controlled device functions in the role of a server, responding to requests from control points. Both control points and controlled devices can be implemented on a variety of platforms, including personal computers and embedded systems. Multiple devices, control points, or both may be operational on the same network endpoint simultaneously. Thus the MHD and the HND in FIG. 1 may be arranged to operate as the controlled device, the control point, or both.

A UPnP device MHD, IWU or HND may have a Dynamic Host Configuration Protocol (DHCP) client and it may search for a DHCP server when the device is first connected to the network. Alternatively, the devices autoconfigure (Auto-IP) themselves when a DHCP server is not present in the network. The prerequisite for using the UPnP functions is to obtain an IP address (Step 0). According to an embodiment, the IWU is arranged to forward the broadcast messages related to address acquisition to the MHD. Broadcast messages are used by the address resolution protocol that is used to find out which device has a specific IP address. Broadcasts are also used when autoconfiguring the system. It is also feasible that some other broadcast messages are forwarded to the MHD, whereas some broadcast messages may be prevented from being transmitted.

Once an IP address is allocated to a UPnP device, the following UPnP functions are available. Discovery is Step 1 in UPnP™ networking. Through discovery, control points find interesting device(s). Discovery enables description (Step 2) where control points learn about device capabilities, control (Step 3) where a control point sends commands to device(s), eventing (Step 4) where control points listen to state changes in device(s), and presentation (Step 5) where control points display a user interface for device(s). For more details on these functions, reference is made to UPnP Forum specification "*UPnP™ Device Architecture* 1.0", version 1.0.1, 6 May 2003.

Referring to the UPnP Discovery, i.e. Step 1, the UPnP multicast messages are used by SSDP (Simple Service Discovery Protocol) in order to enable UPnP controlled devices to advertise their root/embedded devices and services and for UPnP control points to discover UPnP devices that are of interest to them. According to an embodiment in the UPnP system, the interworking unit IWU is, however, in step 304 of FIG. 3 arranged to discard on the MHS interface at least part of or all of the UPnP Discovery multicast messages that are originated in the HNv1. UPnP multicast messages are sent to a standard address and port: 239.255.255.250:1900. The IWU is arranged to monitor the IP headers of the incoming packets and to prevent the transmission of messages having said address as the destination IP address. Thus the IWU is a link layer device with IP snooping capabilities. The properties of the UPnP messages relating to the Discovery are described in Chapter 1.1.2, 1.1.3, 1.2.2, and 1.2.3.

The IWU does not allow UPnP multicasting to enter MHS domain, but does not prevent multicasting in the opposite direction to the HNv1 domain. In one embodiment, the MHD fulfills the advertisement requirements of UPnP system and advertises itself by multicast messages at least when entering the UPnP system. The MHD may also make inquiries when it needs services from HNv1 domain. The MHD keeps its existence known to the HNv1 control points and refreshes advertisements as needed. In fact, the MHD should be active to be known in the UPnP network and to obtain the current status from the HNv1 network. According to a further embodiment, the level of activity can be adjusted in the MHD, for instance by adjusting the transmission periods of the messages. In the following UPnP functions are illustrated for an MHD functioning as the controlled device in view of the UPnP system. For advertising itself, the MHD according to FIG. 2a initiates the BT (Bluetooth) PAN formation, obtains an IP address (DHCP or Auto-IP), and thereafter advertises its services via SSDP by one or more multicast messages. The IWU forwards these multicast messages to the HVn1 domain. Interested control points may then download the device description and subscribe to events in the MHD. After a time-out period has expired, the PAN is turned to the "sleep" mode. The MHD may refresh its advertisement by sending a new multicast message.

When an HNv1 (controlled) device (HND) advertises its services, the IWU receives the advertisement message and checks at least the IP destination address. As the message is a multicast message, it is not forwarded to the MHD. The IWU treats a search query from an HNv1 device functioning as a control point in a similar fashion, i.e. it is not forwarded to the MHD while it is a multicast message.

However, the IWU is in step 305 arranged to forward unicast messages intended for MHD originated in the HNv1. In this embodiment the IWU forwards unicast messages originated in the HNv1 domain (HND) and addressed to the MHD. Thus the IWU in accordance of FIG. 2a may wake up the Bluetooth PAN when it receives a unicast message to the MHD. For instance, when a (HNv1) control point wishes to perform an action on the MHD, it will send an SOAP (Simple Object Access Protocol) unicast message. The IWU snoops the IP traffic and notices that the control point tries to establish a unicast HTTP session with the MHD. As (based on check in steps 303-304 in FIG. 3) the message is not a multicast message, the IWU re-establishes the BT PAN with the MHD. After the BT BAN is available, the IWU forwards the message to the MHD. The action is performed, and a response is transmitted to the control point. After a predetermined time period the BT PAN between the MHD and the IWU goes to the "sleep" mode.

The MHD may also function as a control point in view of the UPnP system. In this embodiment the above-illustrated principles apply; the IWU forwards all unicast messages to and from the MHD and multicast messages only from the MHD. Thus the MHD may send search queries, receive GENA (General Event Notification Architecture) events and respond to SOAP actions via the IWU to an HNv1 device but it does not receive multicast advertisements from HNv1 devices or search queries from HNv1 control points.

In one embodiment not described in FIGS. 1 and 2, some or all of the above-illustrated features relating to preventing transmission of multicast and/or broadcast messages are implemented in a system where both devices (MHD, HND) use the same networking technology. Thus the intermediate node does not have to provide any adaptation between two different transmission protocols. The intermediate node may then support one-to-one associations between the IWU and the device MHD, HND. Examples of such associations are the IEEE 802.11 association between a mobile terminal and an access point or the association between the LAN MAC of a network card and a single LAN MAC of a switch. The intermediate node may learn which attached devices belong to the HNv1 domain and which belong to the MHS domain by inspecting layer 2 traffic (possibly also IP snooping) by using heuristic means. Then the transmission of the multicast and/or broadcast messages is prevented for the MHDs. For instance, both sides of the intermediate node may be WLAN, Ethernet or BT and the above-illustrated optimization features may still be applied.

Above some examples of feasible identification features were illustrated. However, the invention is not limited to the above illustrated embodiments, but any properties of the message may be compared to the properties determined in predetermined message transmission conditions in order to determine if the transmission of the message should be prevented. For instance, it is possible to use link layer address information such as IEEE 802 MAC layer multicast address identification, only port number, or a combination of multiple identifiers, for instance the combination of IP address and port number as already illustrated.

It will be obvious to a person skilled in the art that, as the technology advances, the inventive concept can be implemented in various ways. The invention and its embodiments are not limited to the examples described above but may vary within the scope of the claims.

The invention claimed is:
1. A method comprising:
checking, at an intermediate node configured to arrange data transmission between first and second devices, a destination address of a packet received from the second device;
comparing at the intermediate node the destination address of the packet with at least one predetermined multicast and/or broadcast address;
preventing at the intermediate node the transmission of the packet to the first device in response to the addresses matching; and
forwarding at the intermediate node the packet to at least the first device in response to the addresses not matching.

2. A method as claimed in claim 1, wherein the method further comprises connecting a first network comprising the first device to a second network comprising the second device, and wherein the first and second networks use different data transmission protocols.

3. A method as claimed in claim 1, wherein the destination address is an internet protocol address.

4. A method as claimed in claim 1, wherein the first device belongs to a mobile handheld subcommittee domain of a universal plug and play system and the second device belongs to a home network version 1 domain of the universal plug and play system.

5. A method as claimed in claim 4, wherein transmission of universal plug and play discovery multicast packets to the first device is prevented.

6. A system comprising:
a first device;
a second device; and
an intermediate node configured to arrange data transmission between the first device and the second device;
wherein at least the second device is configured to multicast and/or broadcast packets to devices in the system, wherein the intermediate node is configured to check a destination address of a packet received from the second device, the intermediate node is configured to compare the destination address of the packet with at least one predetermined multicast and/or broadcast address, and wherein the intermediate node is configured to prevent the transmission of the packet to the first device in response to the addresses matching, and wherein the intermediate node is configured to forward the packet to at least the first device in response to the addresses not matching.

7. An apparatus comprising:
a processor configured to
check, at an intermediate node configured to arrange data transmission between first and second devices, a destination address of a packet received from the second device;
compare at the intermediate node the destination address of the packet with at least one predetermined multicast and/or broadcast address;
prevent at the intermediate node the transmission of the packet to a first device in response to the address matching; and
forward at the intermediate node the packet to at least the first device in response to the address not matching.

8. The apparatus according to claim 7, wherein the processor is configured to cause the apparatus to connect a first network comprising the first device to a second network comprising the second device and the first and second networks use different data transmission protocols.

9. The apparatus according to claim 8, wherein the processor is configured to cause the apparatus to perform data transmission between an IEEE 802-based network to which the second device belongs and a bluetooth network to which the first device belongs.

10. The apparatus according to claim 7, wherein the destination address is an internet protocol address.

11. The apparatus according to claim 7, wherein the processor is configured to cause the apparatus to provide data transmission between the first device belonging to a mobile handheld subcommittee domain of a universal plug and play system and the second device belonging to a home network version 1 domain of the universal plug and play system.

12. The apparatus according to claim 11, wherein
the processor is configured to prevent transmission of universal plug and play discovery multicast packets to the first device.

13. The apparatus according to claim 7, wherein the processor is configured to check, in addition to the comparison of the destination address of the packet with at least one predetermined multicast and/or broadcast address, if the packet complies with one or more further message transmission conditions, and the processor is configured to allow forwarding of the packet to the first device in response to the packet complying with the one or more further message transmission conditions.

14. A memory storing a computer program, the computer program configured to control a processor to perform the following:
   check, at an intermediate node configured to arrange data transmission between first and second devices, a destination address of a packet received from the second device;
   comparing at the intermediate node the destination address of the packet with at least one predetermined multicast and/or broadcast address;
   preventing at the intermediate node transmission of the packet in the system to a first device in response to the addresses matching; and
   forwarding at the intermediate node the packet to at least the first device in response to the addresses not matching.

15. A memory according to claim 14, wherein the computer program is further configured to control the processor to prevent transmission of universal plug and play discovery multicast packets to the first device.

16. A memory according to claim 14, wherein the computer program is further configured to control the processor to compare one or more properties of the packet to properties specified in predetermined transmission conditions to determine whether the packet should be forwarded to the first device.

17. The apparatus according to claim 7, wherein the processor is configured to check whether the first device is in sleep mode and, when the first device is in sleep mode, the processor is configured to wake up the first device before forwarding the packet to the first device.

18. The apparatus according to claim 12, wherein the processor is configured to cause the apparatus to forward at least broadcast packets relating to address acquisition to the first device.

* * * * *

UNITED STATES PATENT AND TRADEMARK OFFICE
CERTIFICATE OF CORRECTION

PATENT NO. : 8,451,848 B2
APPLICATION NO. : 10/587979
DATED : May 28, 2013
INVENTOR(S) : Vlad Stirbu and Mika Saaranen It is certified that error appears in the above-identified patent and that said Letters Patent is hereby corrected as shown below:

In the Claims

In Claim 7:
Column 8, line 36, "address" should be --addresses--.

In Claim 7:
Column 8, line 39, "address" should be --addresses--.

Signed and Sealed this
Thirtieth Day of July, 2013

Teresa Stanek Rea
*Acting Director of the United States Patent and Trademark Office*